US010503601B2

(12) United States Patent
Goikhman et al.

(10) Patent No.: US 10,503,601 B2
(45) Date of Patent: Dec. 10, 2019

(54) METHOD AND APPARATUS FOR TRACKING OBJECTS IN A FIRST MEMORY

(71) Applicant: Huawei Technologies Co., Ltd., Shenzhen (CN)

(72) Inventors: Shay Goikhman, Hod Hasharo (IL); Antoni Wolski, Helsinki (FI); Eliezer Levy, Hod Hasharo (IL); Antonios Iliopoulos, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 66 days.

(21) Appl. No.: 15/722,384

(22) Filed: Oct. 2, 2017

(65) Prior Publication Data

US 2018/0046548 A1    Feb. 15, 2018

Related U.S. Application Data

(63) Continuation of application No. PCT/CN2015/095796, filed on Nov. 27, 2015.

(30) Foreign Application Priority Data

Apr. 7, 2015  (EP) .................................... 15162564

(51) Int. Cl.
*G06F 11/14* (2006.01)
*G06F 9/46* (2006.01)
*G06F 9/48* (2006.01)

(52) U.S. Cl.
CPC .......... *G06F 11/1407* (2013.01); *G06F 9/466* (2013.01); *G06F 9/4812* (2013.01);
(Continued)

(58) Field of Classification Search
CPC .............. G06F 11/1458; G06F 11/1148; G06F 11/1407; G06F 9/466
See application file for complete search history.

(56) References Cited

U.S. PATENT DOCUMENTS 5,313,647 A  *  5/1994  Kaufman ............ G06F 11/1438
                                                    714/E11.13
5,664,186 A      9/1997  Bennett et al.
(Continued)

FOREIGN PATENT DOCUMENTS

WO    2014062191 A1    4/2014
WO    2014094259 A1    6/2014

OTHER PUBLICATIONS

Machine Translation and Abstract of International Publication No. WO2014094259, Jun. 26, 2014, 27 pages.
(Continued)

*Primary Examiner* — Khoa D Doan
(74) *Attorney, Agent, or Firm* — Conley Rose, P.C.

(57) ABSTRACT

A method for tracking objects in a first memory during a plurality of time intervals is provided, wherein the method comprises: updating, by one or more update threads, copying, by the one or more test threads, the one or more non-copied shadow objects to a second memory, determining, by the one or more test threads whether the step of copying the one or more non-copied shadow objects was successful, and updating, by the one or more test threads, the status variables of corresponding objects that correspond to the one or more non-copied shadow objects that were copied successfully, wherein subsequent bits of the status variables correspond to subsequent time intervals and wherein the one or more update threads and the one or more test threads operate on disjoint sets of bits of the status variables.

20 Claims, 3 Drawing Sheets

(52) U.S. Cl.
CPC ...... *G06F 11/1446* (2013.01); *G06F 11/1466* (2013.01); *G06F 11/1471* (2013.01); *G06F 2201/82* (2013.01); *G06F 2201/84* (2013.01)

(56) References Cited

U.S. PATENT DOCUMENTS

| | | | | |
|---|---|---|---|---|
| 6,314,567 | B1* | 11/2001 | Oberhauser | G06F 8/656 717/170 |
| 6,421,739 | B1* | 7/2002 | Holiday | G06F 11/1474 707/999.001 |
| 7,203,802 | B2 | 4/2007 | Huras et al. | |
| 8,504,873 | B1 | 8/2013 | Deolasee | |
| 2003/0018684 | A1* | 1/2003 | Ohsawa | G06F 9/3842 718/102 |
| 2004/0139127 | A1 | 7/2004 | Pofelski | |
| 2012/0166490 | A1 | 6/2012 | Raatikka | |
| 2013/0091335 | A1 | 4/2013 | Mulcahy et al. | |
| 2014/0089259 | A1 | 3/2014 | Cheng | |
| 2014/0258660 | A1 | 9/2014 | Cheriton | |
| 2015/0143064 | A1* | 5/2015 | Bhargava | G06F 11/1451 711/162 |
| 2016/0077926 | A1* | 3/2016 | Mutalik | G06F 16/1844 711/162 |
| 2017/0371748 | A1* | 12/2017 | Levy | G06F 12/1009 |

OTHER PUBLICATIONS

Kemper, A., et al., "HyPer: A Hybrid OLTP&OLAP Main Memory Database System Based on Virtual Memory Snapshots," ICDE, 2011, pp. 195-206.

Liedes, A., et al., "SIREN: a memory-conserving, snapshot-consistent checkpoint algorithm for in-memory databases," Proceedings of the 22nd International Conference on Data Engineering, Apr. 3-7, 2006, 12 pages.

Salles, M., et al., "An Evaluation of Checkpoint Recovery for Massively Multiplayer Online Games," VLDB, Aug. 24-28, 2009, pp. 1258-1269.

Cao, T., et al., "Fast Checkpoint Recovery Algorithms for Frequently Consistent Application," SIGMOD, Jun. 12-16, 2011, pp. 265-276.

Karlsson, J., "An Implementation of Transaction Logging and Recovery in a Main Memory Resident Database System," Master''s Thesis, Rep. No. LiTH-IDA-Ex-94/04, Linköping University, 1994, 47 pages.

Foreign Communication From a Counterpart Application, European Application No. 15162564.7, European Notice of Allowance dated Jun. 8, 2017, 29 pages.

Foreign Communication From a Counterpart Application, European Application No. 15162564.7, Extended European Search Report dated Oct. 29, 2015, 5 pages.

Foreign Communication From a Counterpart Application, PCT Application No. PCT/CN2015/095796, English Translation of International Search Report dated Mar. 2, 2016, 7 pages.

Foreign Communication From a Counterpart Application, PCT Application No. PCT/CN2015/095796, English Translation of Written Opinion dated Mar. 2, 2016, 5 pages.

* cited by examiner

METHOD AND APPARATUS FOR TRACKING OBJECTS IN A FIRST MEMORY

CROSS-REFERENCE TO RELATED APPLICATIONS

This application is a continuation of International Application No. PCT/CN2015/095796, filed on Nov. 27, 2015, which claims priority to European Patent Application No. EP15162564.7, filed on Apr. 7, 2015. The disclosures of the aforementioned applications are hereby incorporated by reference in their entireties.

TECHNICAL FIELD

The present disclosure relates to a method and an apparatus for tracking objects in a first memory during a plurality of time intervals. The disclosure also relates to a computer-readable storage medium storing program code for carrying out a method for tracking objects in a first memory during a plurality of time intervals.

BACKGROUND

Hardware advances have enabled many high update rate transaction applications to execute completely in-memory. Such applications include event processing systems, electronic trading systems, multiplayer games, service control applications in telecom, measurement systems, scientific simulations and many others.

The durability of update transactions in these applications is typically provided by a periodic checkpointing process that flushes a consistent memory state to a persistent storage, and a logical redo log that records all the modification requests between consecutive checkpoints. In case of a system failure, a restore process uses the latest persistent checkpoint to initialize the memory state, and a replay procedure, to replay the redo log to re-create the application state at the point before the time of the failure.

In such high update rate systems, checkpoint efficiency and the lack of obstruction to the application operation are crucial. The checkpointing process may be very low-overhead and highly efficient in order not to hinder the high update rates, and to enable frequent checkpointing. Frequent checkpointing, in turn, reduces the redo log size and its associated log replay duration at restore-time. Because checkpoints are run repeatedly, an incremental checkpointing method, whereby only objects changed since the previous checkpoint are detected and persisted, is highly valued.

Approaches to checkpointing may utilize specific methods of taking snapshot of various granularities and therefore the logic of checkpoint management is tightly coupled with the logic of taking the snapshot.

For example, the Copy-On-Update method groups application objects into blocks and copies each block to the shadow state each time an object is mutated during the time interval. Since the update threads are concurrently updating the application state, the update thread needs to acquire locks on the blocks it references. By varying the memory block size, Copy-on-Update tradeoffs between copying and locking overhead. The Copy-on-Update method incurs large overhead and spiky latencies making it unsuitable for high-rate updates. Moreover, it involves quiescing the updates for resetting the update marks and recycling the memories of the shadow objects on the outset of a new checkpointing.

The Wait-Free ZigZag method pre-allocates duplicate space for each tuple, and marks which of the copies holds the snapshot of the tuple. Before the start of a new checkpoint, the application needs to quiesce its updates in order to consistently mark one of the copies of each tuple to serve as the next snapshot tuple.

Another popular technique is Bulk-Copy whereby the whole application state is copied for the checkpointing. Bulk-Copy updates incur high latencies, and it is not applicable for some applications, where, for instance, a complex object structure requires 'deep copying'.

Experiments have shown that none of the known snapshotting methods is suitable to sustain the whole dynamic range of update rates. All of the above-mentioned methods are intertwined with the specific snapshot taking method, thereby featuring high complexity. With that complexity, the definition and efficient computation of change sets may be prohibitive. Furthermore, some approaches typically result in the enforcement of either application-specific locking or the quiescence of the updates.

SUMMARY OF THE INVENTION

The object of the present disclosure is to provide a method and an apparatus for tracking objects during a plurality of time intervals that overcome one or more of the above-mentioned problems of some approaches. It is a further object of the present disclosure to provide a computer-readable storage medium storing program code for carrying out such a method.

A first aspect of the disclosure provides a method for tracking objects in a first memory during a plurality of time intervals, the objects comprising one or more status variables, wherein the method comprises the steps updating, by one or more update threads, the status variables of changed objects, which are objects that have changed during a current time interval, creating, by one or more test threads, when a new time interval starts, for each object a shadow object that captures a state of the object and that corresponds to the object, evaluating, by the one or more test threads, status variables of the shadow objects to determine one or more non-copied shadow objects that comprise non-copied changes, copying, by the one or more test threads, the one or more non-copied shadow objects to a second memory, determining, by the one or more test threads whether the step of copying the one or more non-copied shadow objects was successful, and updating, by the one or more test threads, the status variables of corresponding objects that correspond to the one or more non-copied shadow objects that were copied successfully, wherein subsequent bits of the status variables correspond to subsequent time intervals and wherein the one or more update threads and the one or more test threads operate on disjoint sets of hits of the status variables.

Creating shadow objects that correspond to the objects and capture the state of the objects can be implemented for example by simply copying the objects.

Copying the non-copied shadow objects to a second memory also includes cases where the state of the non-copied shadow objects is persisted on the second memory.

According to the first aspect of the disclosure, one or more update threads can update objects, e.g. memory resident objects of an application, and mark the updated objects as changed for the current time interval, while another set of threads, the one or more test threads, creates shadow objects and tests the shadow objects for any previous change. The one or more update threads and the one or more test threads work on disjoint set of bits in the change status variables, which are marked accordingly.

Each of the objects holds a status variable that indicates whether the object is changed. The one or more update threads and the one or more tests threads access the status variables. In particular, the one or more update threads can access the status variables of the objects themselves, whereas the one or more test threads access the status variables of the shadow objects.

The method ensures that the one or more update threads and the one or more test threads operate on disjoint sets of bits of the status variables. Therefore, race conditions, where the outcome indeterministically depends on the timing between the involved threads, are avoided.

In a first implementation of the method according to the first aspect, creating the shadow objects comprises a step of forking a child process.

Forking a child process, e.g. using the fork( ) system call, creates a child process whose address space serves as the snapshot. Thus a snapshot-consistent state is created. The data of the parent process (which e.g. comprises the objects can be lazily "replicated" in a dynamic fashion (copy on write) with the operating system (OS) page granularity whenever a data mutation takes place. The fork-based method of creating the shadow objects exemplifies a clear logical separation between snapshot and the computation of change-sets.

In a second implementation of the method according to the first aspect, the method is a checkpointing method for creating persistent copies of the objects, wherein the one or more non-copied shadow objects are copied to a persistent storage, in particular a hard disk. This is of particular relevance for ensuring that no changes to the objects are lost, e.g. due to a power failure, which may affect the first memory, but not the persistent storage.

Thus, the method of the present disclosure can be used in the context of an incremental, snapshot-consistent checkpoint process, which in a general setting can for example be defined as follows. There is a set of update threads that continuously modify a set of memory-resident objects. At a checkpoint time, a consistent snapshot of the application memory state is taken, thereby capturing consistent memory state within immutable objects, called shadow objects. The subset of the shadow objects which were modified by the update threads relatively to the last (successful) checkpoint, called changed set, is flushed to the disk. If the previous checkpoint was not successful, the change sets for the current and the previous checkpoint are united, i.e., the change set that is flushed to disk is computed as the union of the current and the previous change sets.

In a third implementation of the method according to the first aspect, the method comprises a step of starting a new time interval when a checkpoint is requested. Thus, the sequence of time intervals corresponds to the sequence of checkpoints.

In a fourth implementation of the method according to the first aspect, the one or more update threads update the status variables of the one or more changed objects using a mark mask that indicates a current time interval, and/or the one or more test threads update the status variables using a test mask that indicates previous time intervals for which copying the one or more non-copied shadow objects was successful.

An update of an object by any thread in a time interval can be marked by the one or more update threads setting the status variable of the object to the bitwise OR of itself and the specific state of the mark mask at that time interval. The test whether the object is changed can be performed by the comparing of bitwise AND of the specific test mask of the time interval and the status variable with zero.

The test mask and the mark mask indicate different time intervals. Therefore, using these masks to access the objects' status variables (and the status variables of the corresponding shadow objects) is one specific way of ensuring that the one or more update threads and the one or more test threads always operate on disjoint sets of bits of the various status variables. As outlined above, this is important e.g. for avoiding race conditions and undeterministic behavior of the method.

In a fifth implementation of the method according to the fourth implementation of the first aspect, updating the mark mask comprises atomically rotating its bit values and updating the status variables of the objects comprises assigning the status variable of the objects OR-combined with the mark mask. Thus, the mark mask can be advanced by rotating it one bit left, thereby atomically starting a new time interval. This is a particularly efficient way of updating the mark mask and accessing the status variables using the mark mask.

In embodiments of the disclosure, the test mask holds the value of the mark mask from the last time interval during the current time interval if the last checkpoint was successful. Thus, during the checkpointing interval newly changed objects are marked with the new mark mask, while their shadow objects are tested for change using the previous mark mask. At the end of the time interval the test mask is set to the value of mark mask. Additionally, the bits in the status variable that represented the change in the detected objects are reset to zero. If the checkpoint fails for some reason, the test mask can be set to the bitwise OR of itself and the value of the mark mask, thereby enabling the testing for the currently and previously changed object in the next time interval.

In a sixth implementation of the method according to the first aspect, evaluating the status variables comprises atomically evaluating a bitwise AND-combination of the test mask and the status variables. This is a particularly efficient way of evaluating the status variables using the test mask.

In a seventh implementation of the method according to the first aspect, the test mask is set to the value of the mark mask when it is determined that all objects have been successfully copied, and/or the test mask is set to the mark mask OR-combined with the test mask when it is determined that copying of at least one of the changed objects failed.

In an eighth implementation of the method according to the first aspect, the test mask and/or the mark mask are initialized to 1. This provides a well-defined starting point of the method.

If there are more checkpoints and time intervals than the status variables can store, the method can use a wraparound, i.e. it starts again from the first bit of the status variables and the masks. For example, if the status variables and the test mask and mark mask are 32-bit variables, these 32 bit can correspond to the first 32 time intervals, and correspondingly to the first 32 checkpoints, if the method is a checkpointing method. For the 33rd checkpoint, the first bit can be used again. In other words, the time interval with number N+1 (where N is the size of the mark mask and/or the status variables in bits) corresponds again to the first bit of the mark mask and the status variables.

If for more than N of the previous intervals there are uncopied changes, this can lead to the method "forgetting" some uncopied changes. Therefore, the method of the first aspect may comprise a step of verifying whether for more than N previous intervals there are uncopied changes, wherein N is the number of bits of the status variables, the mark mask and/or the test mask. In that case, the method can comprise a step of generating an alert signal, e.g. a visual and/or acoustic signal that can notify an operating person that the checkpointing is not successful. The method can also then automatically change to a different approach of generating consistent checkpoints. For example, since it is no longer possible to track new changes, it could, as an emergency measure, revert to creating copies of all objects for each of the checkpoints. This is resource-consuming, but may be preferable to not storing changed objects.

In a ninth implementation of the method according to the first aspect, the mark mask and/or the test mask are global variables and/or the status variables of the objects are local variables of the objects. By using local variables, it can be ensured that only the objects themselves have access to their status variables, i.e., unauthorized access to their status variables can be prevented.

In a tenth implementation of the method according to the first aspect, the status variable of an object and the status variable of a corresponding shadow object are shared. This allows for a more efficient implementation, as unnecessary copying of the status variables can be avoided.

In an eleventh implementation of the method according to the first aspect, updating the status variables of the corresponding objects comprises setting one or more of the status variables to a bitwise XOR-combination of the one or more of the status variables and the bitwise AND-combination of the status variable and the test mask.

In a twelfth implementation of the method according to the first aspect, the status variables of the objects are managed by the objects. This can apply both to the (original) objects and the shadows objects that correspond to the objects. This implementation ensures that unauthorized access to the status variables is prevented.

According to a second aspect of the disclosure, there is provided an apparatus for tracking objects in a first memory during a plurality of time intervals, wherein the apparatus comprises the first memory, a second memory, a first processing core and a second processing core, wherein the first processing core is configured to execute one or more update threads which update status variables of changed objects, which are objects that have changed during a current time interval, and, the second processing core is configured to execute one or more test threads which perform the steps when a new time interval starts creating for each object a shadow object that captures a state of the object and that corresponds to the object, evaluating status variables of the shadow objects to determine one or more non-copied shadow objects that comprise non-copied changes, copying the one or more non-copied shadow objects to a second memory, determining whether copying the one or more non-copied shadow objects was successful, and updating the status variables of corresponding objects that correspond to the one or more non-copied shadow objects that were copied successfully, wherein subsequent bits of the status variables correspond to subsequent time intervals and wherein the one or more update threads and the one or more test threads operate on disjoint sets of bits of the status variables. In particular, the apparatus can be configured to carry out the method of the first aspect or one of the implementations of the first aspect. That is to say, it can be configured to comprise means to carry out the method of the first aspect or one of the implementations of the first aspect.

A third aspect of the disclosure provides a computer-readable storage medium storing program code, the program code comprising instructions for carrying out the method of the first aspect or one of the implementations of the first aspect.

As outlined above, embodiments of the disclosure can impose a clear separation of concerns between the method of taking a snapshot and the computation of change-sets. The need to suspend update threads can be obviated. The marking overhead of the one or more update threads can be light-weight and wait-free as no locks are used. In some embodiments, all objects' change status variables are updated atomically with bitwise operations. In embodiments, changes can be tracked across consecutive checkpoints, with the next checkpointing start being atomic and instantaneous. The correctness of the method, including avoidance of race conditions, is implied by its design. Finally, the above features can imply an idempotent checkpoint: despite the failures, all data object changes are persisted.

BRIEF DESCRIPTION OF THE DRAWINGS

To illustrate the technical features of embodiments of the present disclosure more clearly, the accompanying drawings provided for describing the embodiments are introduced briefly in the following. The accompanying drawings in the following description are merely some embodiments of the present disclosure, but modifications on these embodiments are possible without departing from the scope of the present disclosure as defined in the claims.

DETAILED DESCRIPTION OF THE EMBODIMENTS

Figure 1:
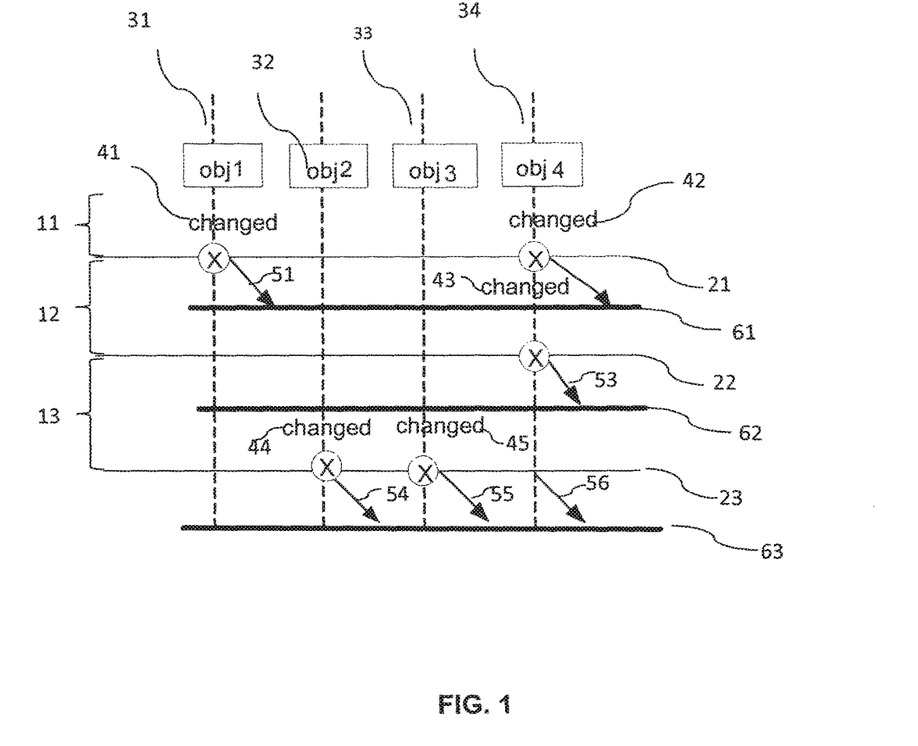
FIG. 1 shows a schematic illustration of a method of persisting object changes during a plurality of time intervals in accordance with the present disclosure.

FIG. 1 provides an illustration of a checkpoint method, where a plurality of four objects 31, 32, 33 and 34 are tracked over four time intervals 11, 12, 13. The first time interval 11 precedes the first checkpoint 21. The second and third time intervals 12, 13 are defined as the intervals between first, second and third checkpoint 21, 22, 23. The fourth time interval 14 comes after the third checkpoint 24. The first and fourth objects 31, 34 are changed (indicated with reference numbers 41, 42) in the first interval 11. The fourth object is changed 43 again in the second interval 12. In the third interval 13, the second and third object 32, 33 are changed 44, 45.

In the first time interval 11 (that ends at the time of the first checkpoint 21), the change sets consist of the first and fourth object 31, 34, i.e., the objects that were modified before the first checkpoint 21. At the time of the first checkpoint, i.e., when the second time interval is started the objects are marked as changed relatively to the first checkpoint. The change set consisting of the first and fourth object 31, 34 is persisted successfully during the second time interval.

On the outset of the third time interval the change set consisting of the fourth object is detected, i.e., it is detected that obj4 has been modified between the first and second checkpoint 21, 22. It is attempted to flush the second change set to disk. That results (for some unknown reason) in a disk write failure. In the fourth time interval 14, the computed change set consists of the second, third and fourth object 32, 33, 34. This change set results from the union of the fourth object 34 that failed to persist in the third time interval 13 and the change set consisting of the second and third object 32, 33 that is detected as changed in the third time interval 13.

In general, applying the 'separation of concerns' concept, the method of snapshot capture needs not be of the checkpointing method's concern, as long as a consistent immutable replica of the state of the objects is created.

At the outset of a new checkpoint, the status variables of the objects that have changed relatively to the last checkpoint need to be retained, together with the marking of all the objects as unchanged for the duration of the forthcoming checkpoint, all these in the presence of multiple parallel updates.

Figure 2A:
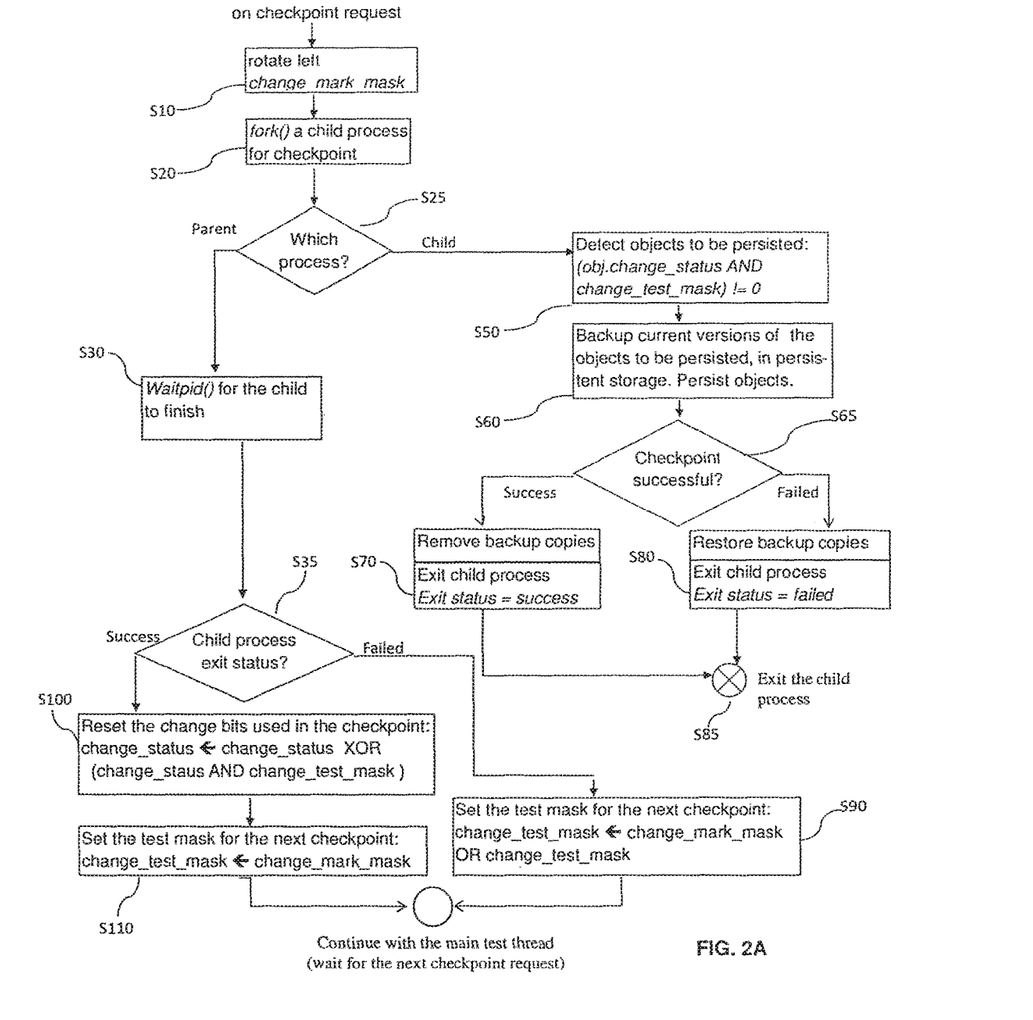
FIG. 2A shows a flow chart of method steps that are carried out by one or more test threads according to an embodiment of the present disclosure.

FIG. 2A is a flow chart of the method steps that are carried out by a test thread. The embodiment shown in FIG. 2A is an example of an in-memory database fork( )-based, snapshot-consistent and incremental checkpoint method.

In the following, change_mark_mask is an example of a mark mask, change_test_mask is an example of a test mask, change_status, change_status_i and change_status_j are examples of status variables of the objects and/or the shadow objects.

There are several threads running in the database with one of them, called the test thread, managing the execution of an incremental checkpoint. The test thread rotates a change_mark_mask in step S10, forks a child process in S20, thereby creating a consistent snapshot with shadow objects that correspond to the objects of the parent thread, and then in step S30 the parent test thread waits for the child process to report its exit status.

In step S25, the control flow depends on whether it is the parent or the child process is executed.

In step S50, the child process traverses all shadow objects in the application state testing if they have been changed using the change_test_mask. This is done by ANDing the change_test_mask with the object's change_status member variable. If the result is non-zero, it means that a change is detected, and, subsequently, that shadow object is persisted to the file system as a new file, while copying the existed file to a backup copy (step S60). The checkpoint is considered successful if all the new files are safely stored in the file system. Otherwise, if any of the new files fails to be stored in the file system, all of the backup copies are restored as the current checkpoint files (step S80). In that case the child process exits and reports a failure as its exit status.

Upon the exit of the child process, the parent process wakes up (step S30) and tests the exit status of the child process. If the exit status is successful, the parent process clears all the bits in the change_status that represented the change in the changed objects (step S100). That is to ensure a clean state when the change_mark_mask overwraps. The overwrapping can occur e.g. when the number of time intervals is larger than the size (in bits) of the mark variable and/or the mark mask.

Then, in step S110 the parent process sets the change_test_ mask by using the value of change_mark_mask. Normally, after a successful checkpoint, only one bit is left in the change_test_mask. If the checkpoint was not successful, the change_test_mask is ORed with the change_mark_mask, thereby uniting the current change set with the previous one. That occurs in step S90. Multiple 'ones' in the change_test_mask indicate that one or more consecutive checkpoints have failed. Finally, the test thread sets to wait for the next checkpoint request.

In the following, the execution of the method is illustrated with specific example values of the status variables change_status_i and change_status_j, the test mask change_test_mask and the mark mask change_mark_mask. In the example, it is demonstrated how the values of the involved status variable and masks evolve during two time intervals following the initialization of the system. We follow the change status of two objects: Oi and Oj. We also assume that the first checkpoint effort fails which results in the need to eventually checkpoint data objects changed during two time intervals. The second checkpoint effort succeeds. For brevity of the example, 4-bit values are used.

Initial values upon system initialization are:
 change_test_mask=0001
 change_mark_mask=0001

We assume that there are two data objects Oi and Oj. Their respective status variables initially have the value of zero:
 change_status_i=0000
 change_status_j=0000

Assume the object Oi is updated before the first checkpoint request is issued. That results in setting its change_status in the following way:
 change_status_←change_status_i OR change_mark_mask
 change_status_i=0000
OR
 change_mark_mask=0001
 change_status_i=0001

In step S10, upon a new checkpoint request, the main test thread is activated and change_mark_mask is rotated left and becomes [0010]. In step S20, the test thread forks a child process and, in the parent process, waits for the child process to exit (step S30).

In step S40, the object Oj is updated by an update thread, in the parent process. First, it is checked that the change has not been marked already. That is to protect against unnecessary writes.
 change_status_j=0000
AND
 change_mark_mask=0010
 Result=0000

Because the result was zero (no change recorded), the change is recorded, for the object Oj:
 change_status_j=0000
OR
 change_mark_mask=0010
 change_status_j=0010

Note that this change is not visible in the child (forked) process. Meanwhile, in the child process, the checkpoint processing takes place. In step S50, all data objects' change_status members are tested (with AND) against the change_test_mask. If the result is non-zero, the given object is persisted.
 change_status_i=0001
AND
 change_test_mask=0001
 Result=0001
 change_status_j=0000 (the value visible in the child process)
AND
 change_test_mask=0001
 Result=0000

The objects whose change test result is non-zero are persisted. In this case, the object Oi is persisted daring this time interval.

In step S60, a backup copy of the existing persistent object Oi is created, in persistent storage. Then, the object Oi itself is persisted.

At this point we assume the child process of the test thread has failed for some reason, e.g. an I/O error. The backup copy of the object Oi is restored in place of the persisted one, to revert to the state before the checkpoint has started (step S80). Then, the child process of the test thread exits with the 'failed' exit status.

The test main thread tests the child's exit status and, because it 'failed', it replaces the change_test_mask with the result of change_mark_mask OR change_test_mask (step S90).

change_test_mask←change_mark_mask OR change_test_mask
    change_mark_mask=0010
OR
    change_test_mask=0001
    change_test_mask=0011

At the next checkpoint request, a new time interval starts. The change_mark_mask is rotated left by the test thread and it becomes [0100] (step S10).

In step S20, the test thread forks a child process and, in the parent process (determined in step S25), waits for the child process to exit (step S30).

Let us assume that the object Oj is updated in the update thread, at this time. The corresponding change bit is set.

change_status_j=0010
OR
    change_mark_mask=0100
    change_status_j=0110

Note: this change is visible only in the parent process.

Meanwhile, in the child process, the checkpoint processing takes place. In step S50, all data objects' change_status members are tested (with AND) against the change_test_mask. If the result is non-zero, the given object is persisted.

change_status_i=0001
AND
    change_test_mask=0011
    Result=0001
    change_status_j=0010 (the value visible in the child process)
AND
    change_test_mask=0011
    Result=0010

The objects whose change test result is non-zero are persisted. In this case, both objects Oi and Oj are persisted during this time interval.

In step S60, first, a backup copy of the existing objects Oi and Oj are created, in persistent storage. Then, the objects Oi and Oj are persisted.

This time, the checkpoint is executed successfully. The backup copies of Oi and Oj are discarded (removed from the persistent storage) (step S70). Then, the child process test thread exits with the 'success' exit status.

Figure 2B:
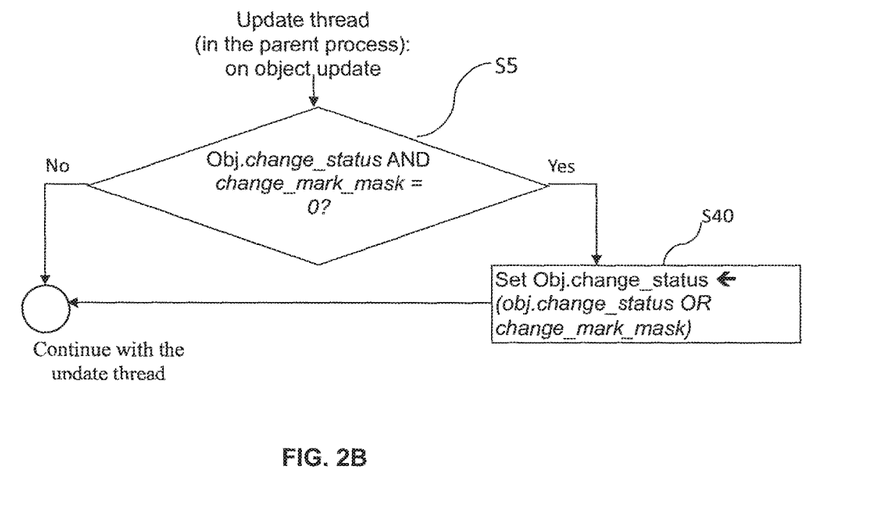
FIG. 2B shows a flow chart of method steps that are carried out one or update threads according to an embodiment of the present disclosure.

FIG. 2B illustrates the method steps of an embodiment of the disclosure that are carried out by the one or more update threads. An update thread uses the value in change_mark_mask to test whether the object's change_status is already updated. That is to avoid unnecessary cache line invalidation and update serialization in the case the object's change_status has already been updated by this thread, or other concurrent threads modifying the change_status simultaneously. If the change_status has not been updated (determined in step S5), it is updated in step S40.

The foregoing descriptions are only implementation manners of the present disclosure; the protection of the scope of the present disclosure is not limited to this. Any variations or replacements can be easily made by persons skilled in the art. Therefore, the protection scope of the present disclosure should be subject to the protection scope of the attached claims.

The invention claimed is:

1. A method for tracking a plurality of objects in a first memory, each of the objects comprising one or more status variables, the method comprising:
updating, by one or more update threads, the one or more status variables of changed objects of the plurality of objects, wherein the changed objects changed during a current time interval;
creating, by one or more test threads when a new time interval starts, for each of the plurality of objects, a shadow object comprising the one or more status variables;
evaluating, by the one or more test threads, the one or more status variables of each of the shadow objects to determine one or more non-copied shadow objects comprising non-copied changes;
copying, by the one or more test threads, the one or more non-copied shadow objects to a second memory;
determining, by the one or more test threads whether copying the one or more non-copied shadow objects was successful; and
updating, by the one or more test threads, the one or more status variables of corresponding ones of the plurality of objects that correspond to ones of the one or more non-copied shadow objects that were copied successfully,
wherein subsequent bits of the one or more status variables correspond to subsequent time intervals, and
wherein the one or more update threads and the one or more test threads operate on disjoint sets of bits of the one or more status variables.

2. The method of claim 1, wherein creating the shadow objects comprises forking a child process.

3. The method of claim 1, wherein the second memory comprises a persistent storage.

4. The method of claim 3, further comprising starting the new time interval when a checkpoint is requested.

5. The method of claim 1, wherein updating the one or more status variables of the one or more changed objects comprises using a mark mask that indicates the current time interval.

6. The method of claim 1, wherein updating the one or more status variables of the corresponding ones of the plurality of objects comprises using a test mask that indicates previous time intervals for which copying the one or more non-copied shadow objects was successful.

7. The method of claim 5, wherein updating the mark mask comprises atomically rotating its bit values and wherein updating the one or more status variables of the plurality of objects comprises assigning the one or more status variables of the plurality of objects OR-combined with the mark mask.

8. The method of claim 5, wherein evaluating the status variables comprises atomically evaluating a bitwise AND-combination of the test mask and the one or more status variables.

9. The method of claim 5, wherein a test mask is set to the value of the mark mask when it is determined that all of the one or more non-copied shadow objects have been successfully copied or the test mask is set to the mark mask OR-combined with the test mask when it is determined that copying of at least one of the one or more non-copied shadow objects failed.

10. The method of claim 5, wherein a test mask or the mark mask are initialized to 1.

11. The method of claim 1, wherein one of the one or more status variables of one of the plurality of objects and one of the one or more status variables of a corresponding shadow object are shared.

12. The method of claim 1, wherein updating the one or more status variables of the corresponding objects comprises setting one or more of the one or more status variables to a bitwise XOR-combination of the one or more status variables and setting a different one or more of the one or more status variables to a bitwise AND-combination of the different one or more status variables and the test mask.

13. The method of claim 1, wherein the one or more status variables of the plurality of objects are managed by the plurality of objects.

14. An apparatus for tracking a plurality of objects in a first memory, wherein the plurality of objects each comprise one or more status variables, and wherein the apparatus comprises: the first memory, a second memory, a first processing core, and a second processing core,
    wherein the first processing core is configured to execute one or more update threads which update the one or more status variables of changed objects of the plurality of objects, wherein the changed objects changed during a current time interval,
    wherein the second processing core is configured to execute one or more test threads which perform the steps:
        when a new time interval starts creating for each of the plurality of objects a shadow object comprising the one or more status variables;
        evaluating the one or more status variables of each of the shadow objects to determine one or more non-copied shadow objects comprising non-copied changes;
        copying the one or more non-copied shadow objects to a second memory;
        determining whether copying the one or more non-copied shadow objects was successful; and
        updating the one or more status variables of corresponding objects that correspond ones of the plurality of objects that correspond to ones of the one or more non-copied shadow objects that were copied successfully,
    wherein subsequent bits of the one or more status variables correspond to subsequent time intervals, and
    wherein the one or more update threads and the one or more test threads operate on disjoint sets of bits of the one or more status variables.

15. The apparatus of claim 14, wherein creating the shadow objects comprises forking a child process.

16. The apparatus of claim 14, wherein the second memory comprises a persistent storage.

17. A non-transitory computer-readable storage medium storing program code, the program code comprising instructions that when executed by a processor cause the processor to:
    update, by one or more update threads, one or more status variables of changed objects of a plurality of objects, wherein the plurality of objects each comprise one or more status variable, and wherein the changed objects changed during a current time interval;
    create, by one or more test threads, when a new time interval starts, for each of the plurality of objects, a shadow object comprising the one or more status variables;
    evaluate, by the one or more test threads, the one or more status variables of each of the shadow objects to determine one or more non-copied shadow objects comprising non-copied changes;
    copy, by the one or more test threads, the one or more non-copied shadow objects to a second memory;
    determine, by the one or more test threads whether the step of copying the one or more non-copied shadow objects was successful; and
    update, by the one or more test threads, the one or more status variables of corresponding ones of the plurality of objects that correspond to ones of the one or more non-copied shadow objects that were copied successfully,
    wherein subsequent bits of the one or more status variables correspond to subsequent time intervals, and
    wherein the one or more update threads and the one or more test threads operate on disjoint sets of bits of the one or more status variables.

18. The non-transitory computer-readable storage medium of claim 17, wherein the instructions to create the shadow objects comprises instructions to fork a child process.

19. The non-transitory computer-readable storage medium of claim 17, wherein the second memory comprises a persistent storage.

20. The non-transitory computer-readable storage medium of claim 19, wherein the instructions further cause the processor to start the new time interval when a checkpoint is requested.

* * * * *